United States Patent
Newton et al.

[11] Patent Number: 5,803,611
[45] Date of Patent: Sep. 8, 1998

[54] MARINE BEARING ASSEMBLY

[76] Inventors: John R. Newton, 485 Royal Palm Way, Boca Raton, Fla. 33432; Jeffrey W. Strong, 207 Elsa Rd., Jupiter, Fla. 33477

[21] Appl. No.: 856,637

[22] Filed: May 15, 1997

[51] Int. Cl.$^6$ .............................. F16C 3/00; F16C 17/22
[52] U.S. Cl. ...................... 384/97; 29/898.055; 384/278; 384/904; 384/905
[58] Field of Search ............................. 384/97, 278, 295, 384/297, 315, 905, 904; 29/898.055

[56] References Cited

U.S. PATENT DOCUMENTS

| | | | |
|---|---|---|---|
| 2,459,598 | 1/1949 | Stott | 384/278 |
| 3,022,128 | 2/1962 | Reuter | 384/905 X |
| 4,620,805 | 11/1986 | Belanger | 384/297 |
| 5,236,784 | 8/1993 | Kobayashi et al. | 384/907 |
| 5,370,400 | 12/1994 | Newton et al. | 384/97 X |

Primary Examiner—Thomas R. Hannon
Attorney, Agent, or Firm—Michael Ebert

[57] ABSTRACT

A marine bearing assembly for a propeller shaft suitable for a vessel which travels in intensely cold seawater where a conventional bearing, as a result of its contraction, would seize the shaft and prevent it from rotating. The assembly includes a cylindrical body having an axial bore therein to receive the rotating shaft, the body being formed of UHMW polyethylene having a low coefficient of friction and a high coefficient of thermal contraction. To complete the assembly, the body is exposed to a temperature below the freezing point of water to cause it to contract. The contracted body is then press-fitted into a sleeve whose internal diameter matches the contracted diameter of the body, whereby at higher temperatures the body seeks to expand, but being confined within the sleeve it is held under compression. When the vessel in which the assembly is installed enters cold seawater, the UHMW body does not contract about the propeller shaft but contracts away from the sleeve in which it is confined and is therefore under reduced compression whereby the diameter of the axial bore is not significantly altered and the shaft remains free to rotate.

9 Claims, 1 Drawing Sheet

MARINE BEARING ASSEMBLY

BACKGROUND OF INVENTION

1. Field of Invention

This invention relates generally to marine bearing for rotating propeller shafts, and in particular to a bearing assembly useable in vessels that travel through intensely cold seawater in which a conventional bearing would contract and seize the shaft.

2. Status of Prior Art

In propeller-driven water-craft, the rotating propeller shaft goes through one or more bearing sleeves located along the shaft between the shaft mooring in the hull and the propeller mounted on the free end of the shaft.

The concern of the present invention is with bearings for propeller shafts which are subjected to intensely cold seawater. The freezing point of water is 0° C., whereas seawater because of its brine content, freezes at about −1.9° C. or 28.6° F. Hence when a vessel enters intensely cold seawater, such as those encountered in Arctic and Sub-Arctic regions, a conventional bearing sleeve having a bore therein through which the propeller shaft extends, will contract to seize the propeller and prevent it from rotating. Thus a ship going from Panama to Alaska with a shaft bearing of large diameter, would in Alaska change in diameter as much as one tenth of an inch and thereby impair the function of the bearing.

Of particular prior art interest is the marine bearing disclosed in the prior Newton et al. U.S. Pat. No. 5,370,400 in which a propeller shaft passes through a hull-mounted bearing formed of ultra-high molecular weight (UHMW) polyethylene. This polymer has an exceptionally low coefficient of sliding friction close to that of TEFLON, the slipperiest of all solid materials; and therefore requires no lubrication. The advantage of UHMW plastic as a marine bearing material is that it will not absorb water, nor will it freeze, for this polymer has no cold embrittlement characteristics.

Coaxial with the shaft and placed at the end of the bearing is an elastomeric seal which prevents seawater from flowing along the shaft into the boat. In the arrangement disclosed in the Newton et al. patent, water is conducted along the shaft rotatable within the UHMW bearing to the elastomeric seal to cool and lubricate the seal, but not the bearing which requires no lubrication for by its very nature it is a solid lubricant.

UHMW polyethylene has high structural strength, as well as a low coefficient of sliding friction, and while a bearing of this material is generally suitable for a marine propeller shaft, it is not acceptable for vessels which travel in seawater whose temperature is close to the freezing point. A UHMW bearing has a high coefficient of thermal expansion and contraction. Hence in very cold waters this bearing will shrink to seize the propeller shaft and render the propeller inoperative.

Also of prior art interest is the Stott U.S. Pat. No. 2,459,598 which discloses a bearing made of nylon having a low coefficient of friction and does not therefore require lubrication. The difficulty with nylon as a bearing material is that its coefficient of thermal expansion is ten times greater than that of steel. To prevent the nylon bearing from expanding it is placed within a metal sleeve having a low coefficient of thermal expansion. But this arrangement does not prevent the nylon bearing from contracting in very cold seawater and seizing the propeller shaft.

The Belanger U.S. Pat. No. 4,620,805 discloses a bearing for use in car wash operations in which a cylindrical UHMW bearing is housed in a rigid sleeve. But this sleeve does not prevent the bearing from contracting under very low temperature conditions.

Kabayashi et al. U.S. Pat. No. 5,236,784 discloses a plastic bearing press-fitted into a metal sleeve. The concern of this patent is wear resistance, and for this purpose vitreous carbon is added to the plastic.

SUMMARY OF INVENTION

In view of the foregoing, the main object of this invention is to provide a marine bearing assembly for a propeller shaft that is suitable for vessels which travel in intensely cold seawater.

A significant feature of an assembly in accordance with the invention is that it includes a cylindrical bearing body formed of UHMW material and therefore requires no lubrication, yet the body will not seize the shaft in very cold seawater.

More particularly, an object of this invention is to provide an assembly of the above type in which a UHMW cylindrical bearing body is held under compression within a sleeve.

Also an object of the invention is to provide an assembly of the above type which may be manufactured at low cost.

Briefly stated, these objects are attained by a marine bearing assembly for a propeller shaft suitable for a vessel which travels in intensely cold seawater where a conventional bearing as a result of its contraction would seize the shaft and prevent it from rotating. The assembly includes a cylindrical body having an axial bore therein to receive the rotating shaft, the body being formed of UHMW polyethylene having a low coefficient of friction and a high coefficient of thermal contraction.

To complete the assembly, the body is exposed to a temperature below the freezing point of water to cause it to contract. The contracted body is press-fitted into a sleeve whose internal diameter matches the contracted diameter of the body, whereby at higher temperatures the body seeks to expand, but being confined within the sleeve it is held under compression. When the vessel in which the assembly is installed enters cold seawater, the UHMW body does not contract about the shaft for the cold body contracts away from the shaft and is then under reduced compression whereby the diameter of the axial bore is not significantly altered and the shaft remains free to rotate.

BRIEF DESCRIPTION OF DRAWING

For a better understanding of the invention reference is made to the detailed description to follow which is to be read in conjunction with the accompanying drawings in which.

DETAILED DESCRIPTION OF INVENTION

Figure 1:
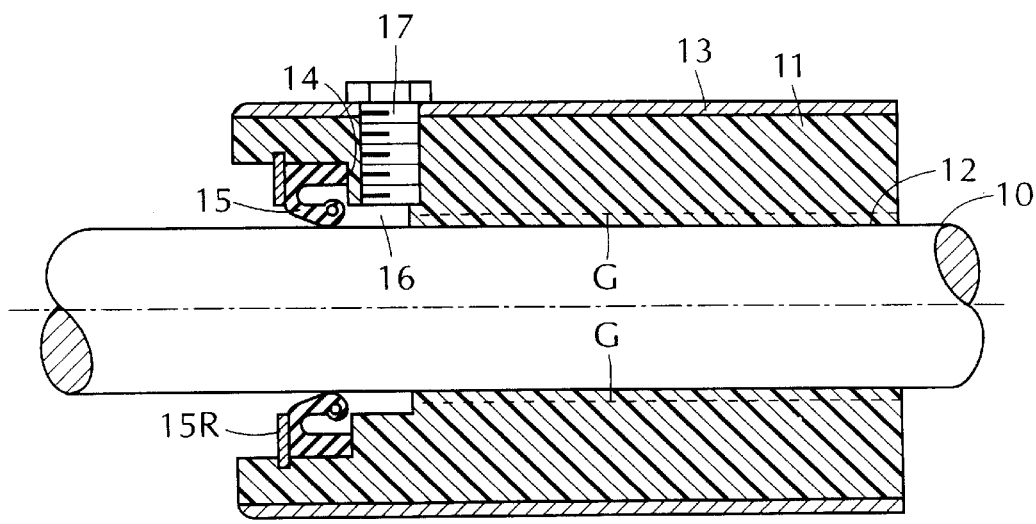
FIG. 1 is a longitudinal section taken through a bearing assembly in accordance with the invention.
Figure 2:
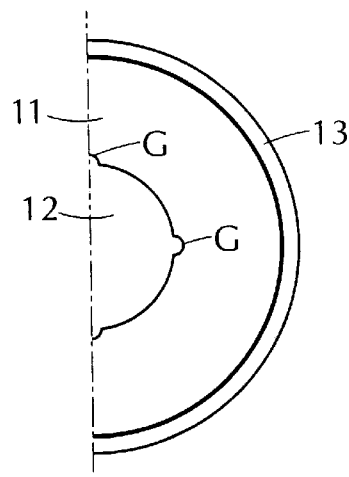
FIG. 2 is a transverse section.

Referring now to FIGS. 1 and 2, there is shown a marine bering assembly in accordance with the invention for supporting a rotating propeller shaft 10. The main components of the assembly are a cylindrical body 11 having an axial bore 12 drilled therein to receive the shaft, and a sleeve 13 surrounding the body which holds it under compression in a manner to be later described.

Cylindrical body 11 is formed of UHMW polyethylene. The bore 12 drilled therein is concentric with the outer surface of the body and has an internal diameter which is substantially the same as the shaft diameter so that the shaft can freely rotate within the bore. Because UHMW bearing material has an extremely low coefficient of sliding friction, little frictional resistance is encountered by the rotating shaft.

Seated in an annular shoulder 14 machined or otherwise formed in the front end of the cylindrical body is an elastomeric seal 15, preferably of Nitrile rubber, whose lip engages the surface of the shaft. Below shoulder 14 is an annular reservoir 16 to receive water flowing along shaft 10 through grooves G formed in the bank of bore 12 which extending the full length of the body.

The water flowing into reservoir 16 acts to cool and lubricate lip seal 15 to maintain it in working condition. Water from reservoir 16 is discharged through a lateral port 17 in the assembly to which a hose may be coupled so that the cooling water flows continuously.

The concern of the present invention is with the adverse effect of very cold water on the UHMW body 11. Because this body has a relatively high coefficient of thermal expansion and contraction, very cold water would normally cause the body to shrink and seize shaft 10 and thereby prevent it from rotating. In order to overcome this problem, bearing body 11 must be held under compression in sleeve 13 which is fabricated of a material having a relatively low coefficient of expansion and contraction, such as a fiberglass-reinforced polymer, i.e., a vinyl resin, or stainless steel.

When therefore the marine bearing assembly is installed on a vessel with a propeller shaft 10 going through bore 12 of UHMW body 11, the shaft is rotatable in the bore whose machined diameter is slightly larger than that of the shaft.

Because axial bore 12 is drilled in bearing body 11 at room temperature, the diameter of the bore will not be the same as when the body is confined under compression in sleeve 13 at a much lower temperature. Hence when drilling bore 12 one must do so in a diameter which when body 11 is under compression in sleeve 13 is then in a diameter which will permit propeller shaft 10 to rotate freely therein.

When this vessel enters a seawater region that is close to the freezing point, bearing body 11 exposed to this cold seawater does not then contract about the propeller shaft, for body 11 is under compression by sleeve 13 and the effect of the intense cold is to contract the bearing body away from the sleeve in which it is confined so that it is then under reduced compression within sleeve 13. Hence the shaft remains free to rotate and is not seized by the body.

Figure 3:
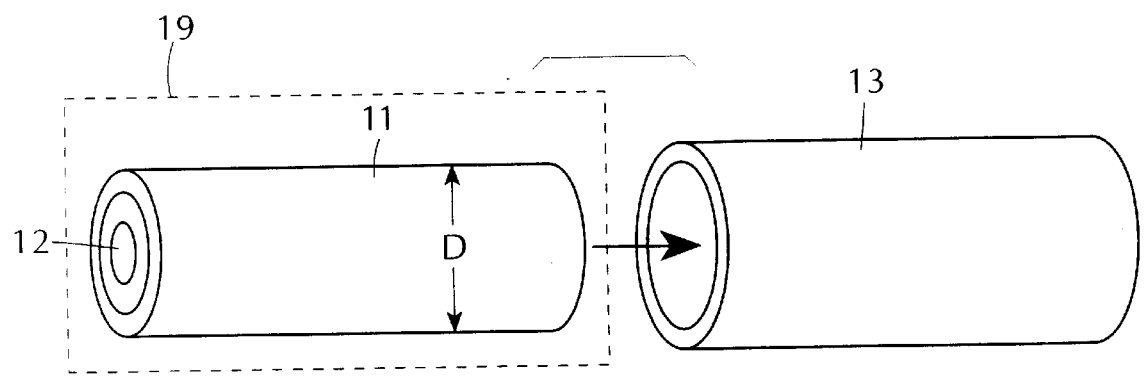
FIG. 3 illustrates schematically the manner in which the bearing component of the assembly is joined to the sleeve component thereof.

In order to put cylindrical body 11 under compression within sleeve 13, body 11 is placed in a freezer chamber 19, as shown in FIG. 3, in which the atmospheric temperature is well below the freezing point of water. Body 11 is held in this chamber until it is also at the same temperature, as a result of what the bearing dimensions are contracted and the diameter D of the cylindrical bearing is then fractionally less than the diameter of the body at room temperature.

When the body is in its contracted state, it is taken from chamber 19 and press-fitted into sleeve 13 whose internal diameter substantially matches diameter D of the contracted body, the cold contracted body then fits snugly in the sleeve but is not under compression.

When body 11 thereafter rises in temperature, it cannot expand, for it is confined within sleeve 13. Hence when body 10 reaches room temperature, it is under heavy compression by sleeve 13, and it is in this condition that it is installed in a vessel.

It is important therefore that sleeve 13 be capable of withstanding the force applied thereto by the compressed UHMW body which seeks to resume its normal room temperature diameter, and for this purpose the sleeve is preferably at least ½ inch thick. Obviously, an appropriate thickness and strength of the sleeve depends on the outer diameter of the UHMW body confined within the sleeve.

Normally a solid bearing body, such as one machined of UHMW material behaves in a predictable way, for when this body is heated, it will expand to a degree that depends on its thermal coefficient of expansion. As a consequence of this expansion, the axial bore in the bearing body which receives the propeller shaft will somewhat increase in diameter. But when the same body is subjected to a freezing temperature, it will then contract and its axial base will have a reduced diameter with a consequent seizing of the shaft.

In a bearing assembly in accordance with the invention, the bearing body is held under heavy compressions within a confining sleeve, and it therefore behaves in a significantly different manner from an unconfined body. When the confined bearing body is subjected to a freezing temperature, it then contracts away from the confining sleeve so that it is then under somewhat less compression. The resultant diameter of the axial bore in the cold body is slightly enlarged; hence it is not significantly altered and the shaft remains free to rotate. While there has been shown and disclosed preferred embodiments of the invention, it will be appreciated that many changes may be made therein without departing from the spirit of the invention.

We claim:

1. A marine bearing assembly for a rotatable propeller shaft suitable for vessels which travel in very cold seawater where a conventional bearing as a result of contraction may seize the shaft, said assembly comprising:

A. a cylindrical bearing body having a bore therein to receive the rotating shaft whose diameter is such that the shaft is free to rotate, said body being formed of a ultra-high molecular weight polymer having a low coefficient of sliding friction and a high coefficient of thermal contraction; and B. a sleeve in which said body is press-fitted in a contracted state at a below-freezing temperature whereby the body at higher temperatures is then held under compression within the sleeve, and when the vessel travels in said cold seawater, the body does not then contract around the shaft but contracts away from the sleeve and is then under reduced compression whereby the diameter of the bore is not significantly altered and the shaft remains free to rotate.

2. An assembly as set forth in claim 1, in which the material is UHMW polyethylene.

3. An assembly as set forth in claim 1, in which the sleeve is formed by a material having a low coefficient of thermal contraction.

4. An assembly as set forth in claim 3, in which the material of the sleeve is a fiberglass-reinforced resin.

5. An assembly as set forth in claim 3, in which the material of the sleeve is steel.

6. An assembly as set forth in claim 1, in which the bearing is provided at one end with a shoulder in which is seated a lip seal for engaging the shaft to prevent water leakage.

7. An assembly as set forth in claim 6, in which the bank in the bore of the bearing has grooves therein to conduct cooling water to the seal.

8. A marine bearing assembly suitable for a vessel which travels in very cold seawater, said assembly comprising:
   A. a cylindrical bearing body formed of UHMW polyethylene having a bore therein to receive a propeller shaft, said bore having a diameter permitting the shaft to rotate when the vessel travels in warm seawater; and
   B. a fiber-reinforced resin sleeve in which the body is press-fitted in a contracted state at a below freezing temperature whereby the body at higher temperatures is then held under compression within the sleeve, and when the vessel travels in said cold seawater, the body does not contract around the shaft, but contracts away from the sleeve and is then under reduced compression whereby the diameter of the bore is not significantly altered and the shaft remains free to rotate.

9. A method for producing an assembly as set forth in claim 8, comprising the steps of:
   A. machining a cylindrical body of UHMW material to provide a cylindrical bearing body having an axial bore therein for receiving the shaft;
   B. subjecting the body to a freezing temperature to put the body in a contracted state; and
   C. press-fitting the contracted body in said sleeve whereby at warmer temperatures the body confined within the sleeve is under compression.

* * * * *